United States Patent
Foppe

(10) Patent No.: US 7,975,482 B2
(45) Date of Patent: Jul. 12, 2011

(54) METHOD AND DEVICE FOR THE UTILIZATION OF SUPERCRITICAL SUBSURFACE STEAM IN COMBINATION WITH SUPERCRITICAL THERMAL AND HYDRAULIC POWER STATIONS

(75) Inventor: Werner Foppe, Geilenkirchen (DE)

(73) Assignee: Franz-Josef Radermacher, Ulm (DE)

( * ) Notice: Subject to any disclaimer, the term of this patent is extended or adjusted under 35 U.S.C. 154(b) by 188 days.

(21) Appl. No.: 12/298,348

(22) PCT Filed: Apr. 25, 2007

(86) PCT No.: PCT/EP2007/003647
§ 371 (c)(1),
(2), (4) Date: Jul. 6, 2009

(87) PCT Pub. No.: WO2007/122003
PCT Pub. Date: Nov. 1, 2007

(65) Prior Publication Data
US 2010/0031653 A1 Feb. 11, 2010

(30) Foreign Application Priority Data

Apr. 25, 2006 (DE) .................. 10 2006 018 215

(51) Int. Cl.
*F03G 7/00* (2006.01)
(52) U.S. Cl. ...................................... 60/641.2; 60/641.3
(58) Field of Classification Search ....... 60/641.2–641.4
See application file for complete search history.

(56) References Cited

U.S. PATENT DOCUMENTS

| | | | |
|---|---|---|---|
| 3,817,038 A | 6/1974 | Pauli | 60/641 |
| 3,986,362 A * | 10/1976 | Baciu | 60/641.2 |
| 4,200,152 A | 4/1980 | Foster | 166/271 |
| 4,326,581 A * | 4/1982 | Rapier | 165/45 |
| 4,358,930 A * | 11/1982 | Pope et al. | 60/647 |
| 4,982,568 A * | 1/1991 | Kalina | 60/649 |
| 5,022,788 A | 6/1991 | Baird | 405/129.35 |
| 6,443,227 B1 | 9/2002 | Hocking | 166/250.1 |
| 6,591,920 B1 | 7/2003 | Foppe | 175/67 |
| 6,668,554 B1 | 12/2003 | Brown | 60/641.2 |
| 2006/0048770 A1 | 3/2006 | Meksvanh | 126/620 |
| 2007/0223999 A1 | 9/2007 | Curlett | 405/55 |

* cited by examiner

Primary Examiner — Hoang M Nguyen
(74) Attorney, Agent, or Firm — Andrew Wilford

(57) ABSTRACT

Disclosed are a method and a device for utilizing supercritical subsurface steam as combined supercritical thermal and hydraulic power stations at an efficiency of 50 percent, using molten bath superdeep drilling technology, a hydrofrac process, and the special properties of the supercritical subsurface steam, such as the drastic increase in the thermal capacity, reduced viscosity, and inorganic solubility. The multifunctional use of said technologies and physical properties of supercritical subsurface steam in the inventive method allows a supercritical subsurface boiler to be tapped rapidly and at a low cost at a great depth while making it possible to produce electricity, power, process steam, and heat almost anywhere at one tenth of the cost of conventional fuel technologies and comparable expenses. The supercritical process steam obtained from a closed forced subsurface-nature circuit is used in supercritical power stations featuring state-of-the-art steam turbine technology while the remaining pressure in the subsurface fluid is used for directly generating power and/or electricity after dissipating heat via hydraulic turbines.

16 Claims, 2 Drawing Sheets

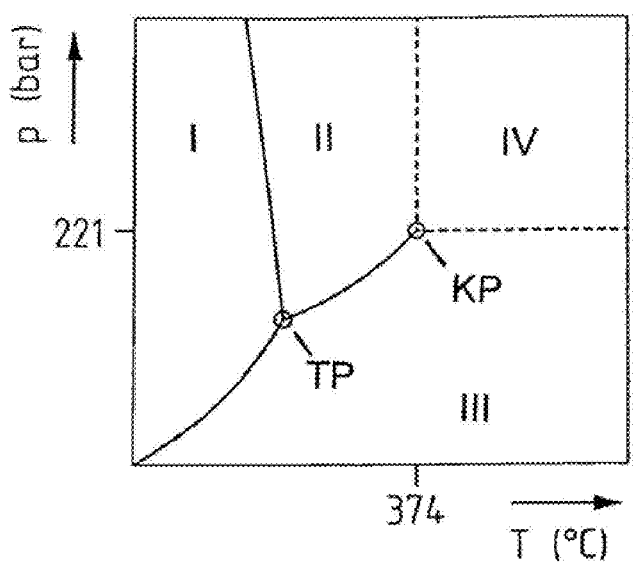
Fig. 2
Fig. 3a
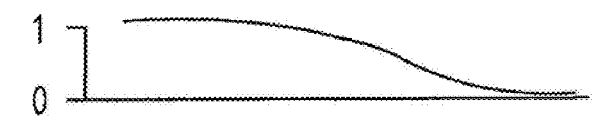
Fig. 3b
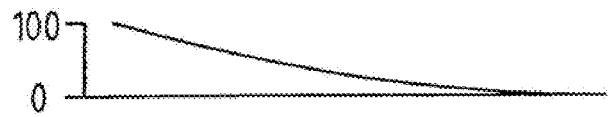
Fig. 3c
Fig. 3d
e)
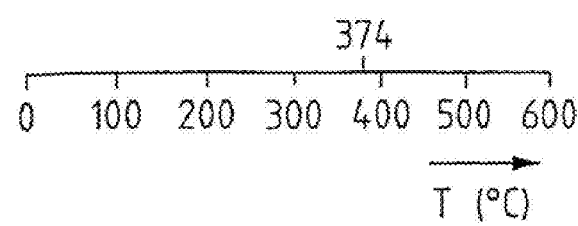

METHOD AND DEVICE FOR THE UTILIZATION OF SUPERCRITICAL SUBSURFACE STEAM IN COMBINATION WITH SUPERCRITICAL THERMAL AND HYDRAULIC POWER STATIONS

CROSS REFERENCE TO RELATED APPLICATIONS

This application is the US national phase of PCT application PCT/EP2007/003647, filed 25 Apr. 2007, published 1 Nov. 2007 as WO2007/122003, and claiming the priority of German patent application 102006018215.4 itself filed 25 Apr. 2006, whose entire disclosures are herewith incorporated by reference.

The invention relates to a method of making and/or operating an SC (super-critical) geosteam system, especially in combination with an SC thermal power plant and an SC hydraulic power plant by means of several boreholes constructed in particular by a metal-melt boring method that each comprise a metallic borehole lining consisting of a casting and continuously constructed from the metallic melt medium. The invention furthermore relates to an SC geosteam system.

The sinking of so-called super-deep boreholes, especially with consistently large borehole diameters down to the boring target is known as a metallic melt boring method from EP 1 157 187 [U.S. Pat. No. 6,591,920]. The contents of this publication are incorporated herewith by way of reference. Such bores comprising a metallic lining formed by the metallic melt medium can preferably be constructed on site, where the needed energy requirement accumulates and the infrastructure for the distribution of energy is present, which makes possible a decentralized energy supply without an expensive interlinking network.

Furthermore, the HDR (hot dry rock) method is known that uses hot, dry rock in volcanic areas or fracture zones in which the hot stone is relatively close (3000-5000 m) below the surface, so that these hot stone regions can still be developed under economical conditions with traditional boring technology. However, unfortunately, the minimal tension of the mountain range in volcanic regions and fracture zones with high temperature anomalies runs vertically, so that even the fissured surfaces in the hot stone produced by hydro-frac run vertically and the fissured surfaces of adjacent boreholes therefore do not intersect as a rule and a thermal exchange via pumped-in water in the form of a loop can only take place via additional bores or naturally present fissures, to the extent present, which results in a reduction of capacity of the project.

Another handicap of the HDR method is conditioned by the "dry stone," as the name says. If this "dry hot stone" is permeated by natural, extensive fissures, it is a faulty bore for the production of heat since the water pumped in to obtain heat results in high losses due to the natural flowoff.

Further handicaps consist in the drawing of packers, that are to be set for carrying out the hydro-frac in the lower borehole part, whose removal, however, often fails and requires new boring or circumvention bores. Pressure limiting by packers and the borehole lining, which is not resistant to high pressure, is a further problem, as hydro-frac tests in the KTB deep boring in Germany showed. (GEOwissenschaften, 13$^{th}$ annual volume, April 1995).

Furthermore, the limitation of the HDR method and of other methods for using geothermal energy is due to the fact that they deal with the current backward boring technology, whose costs increase exponentially with the depth with decreasing borehole diameter and therefore no supercritical water with a high enthalpy for the production of energy can be economically obtained.

The object of the invention is to provide an SC geothermal system and method with which geoheat from very great depths that were previously substantially unexploited can be made useful in an economical manner.

This problem is solved in accordance with the invention in that for the first time a convertible magnetic slider super-deep boring technology is being used in the metallic melt boring method according to EP 1,157 187 B1 and U.S. Pat. No. 5,022,788, with which super-deep bores that are ready for production in a rapid and economical manner and with large, true-to-size borehole diameters, e.g. down to depths of 20 km can be constructed in a continuous melt boring method. During the continuous advance of the magnetic slider melt boring system a seamless pressure casting borehole jacket is formed at the same time from the metallic melt functioning as boring medium, which lining serves as "reaction track" and travel tube for the magnetic slider.

These boreholes lined with pressure casting are custom made for the method in accordance with the invention with an apparatus for using SC geosteam for the operation of SC thermal power plants in combination with hydraulic power plants.

Super-deep boreholes of the type cited above extend to a depth of 10-20 km at which the hot stone is very compact and fissures or cracked zones there are filled with SC fluid and water pumped in at this depth under the prevailing conditions of temperature and pressure also become supercritical and thus has an energy content of approximately 10 times greater per m$^3$, such as, for example, 250-300° C. hot geothermal vapor such as is currently used in Iceland for conversion into electricity in geothermal power plants.

According to the invention, super-deep boreholes for the production of SC geosteam preferably make use of the predominant part of the continental crust in which the minimal tension of the earth's crust runs mainly horizontally and therefore even the fissured surfaces artificially produced by hydro-frac run horizontally in the hot stone and intersect with fissured surfaces of adjacent super-deep boreholes.

According to the invention several, for example, three super-deep boreholes with a production-ready pressure casting lining, e.g. with an inside diameter of 0.5 m are sunk to depths at which supercritical conditions prevail, in particular where the hot stone preferably reaches temperatures of 500° C.-600° C. The super-deep boreholes are guided in such a manner that at the lowest part of the shaft the boreholes are, for example, 1000 m removed from each other and are connected to each other by, e.g. fissure formations located in a stack-like manner above each other that serve as heating surfaces.

The creation of large heating surfaces in the hot stone in accordance with the known hydro-frac method creates a large heat exchanger in the hot deep stone under high water pressure, as was successfully demonstrated for the first time with the HDR (hot dry rock) method in Fenton Hill by Los Alamos LAB 1977 at depths of approximately 3000 m at 185° C. stone temperature, from which a 140° C. fluid was used in a binary secondary heat exchanger for the production of current.

The extension of the substantially elliptical heating surfaces produced by hydro-frac in the hot stone is proportional to the borehole diameter, but in particular to the high water pressure produced, wherewith the pressure stability of the borehole lining and that of the packer excellently determines the extension of the fissured surfaces.

The invention furthermore relates to devices for the production of a supercritical subsurface boiler (SSB) as well as to the SSB apparatus itself, which according to the invention makes possible a geopower production in a closed forced circuit via several, for example, three super-deep boreholes and requires neither packers nor external extremely high pressure pumps that are expensive to install for the production of large primary heat exchanger surfaces in the hot deep stone.

According to the invention, in order to create a supercritical subsurface boiler (SSB) and geoheat exchanger, all, in particular three super-deep boreholes, that are provided with a seamless, thick pressure casting lining and have, for example, an inside diameter of 0.5 m and, e.g. are spaced from each other by 1 kilometer, are connected to each other on the surface and provided with two high-pressure valves.

According to the invention, all, in particular three super-deep boreholes are simultaneously flooded with water by two high-pressure turbines (pumps) via these high-pressure valves.

According to the invention, in the production of super-deep boreholes, for example, 16 km deep, the holding magnets for the construction of the borehole lining from the metal melt are adjusted in such a manner in a lower range, e.g. the lower 3 kilometers, that theoretical breaking points are produced at corresponding intervals, especially radially, that break up at a water pressure correspondingly built up in the shaft and produce correspondingly large, superposed fissured surfaces in the surrounding hot stone under hydro-frac in accordance with the conditions of the position of the theoretical breaking points and intersect with the adjacent boreholes and their fissured surfaces. According to the invention the theoretical breaking points can also be generated subsequently by lasers mounted on a magnetic slider.

According to the invention, in order to produce a horizontal underground heat exchanger (SSB) in the lowest depth of the borehole the horizontal pressure in the deep stone must be greater than the vertical pressure and greater than the superposed pressure of the stone.

Under a hydraulic pressure that is greater than the vertical pressure, horizontal fissured surfaces open in the loaded stone area that readily widen with an increase of pressure since the available high pressure forces per square centimeter attack two sides of the fissured area and thus great loads can be raised as in a hydraulic press.

According to the invention, the expansion of the fissured surface can be varied within a broad range by appropriate elevation of pressure that is required by the thick-walled high-pressure stable pressure casting jacket. According to the invention, the main pressure forces can be made available by the hydrostatic intrinsic pressure of the fluid in the injection shaft, that already have a pressure of approximately 1600 bar, e.g. in the case of a cold-water column in a super-deep borehole shaft 16 km deep and can optionally be made available only by moderate additional pressure of a few hundred bar by high-pressure water turbines or pumps for the "frac work" to be performed.

According to the invention this additionally required pressure performance can be made available by two internal high-pressure water turbines 9 that in particular reduce the remaining pressure energy in the geosteam primary circuit at the pressure heads of the production shafts by, for example, 1000 bar.

After release of the thermal energy of the primary fluid (SC water)—via a secondary heat exchanger 7) into one of the shafts, in particular to its secondary fluid SC-$CO_2$—during the flowthrough of an area designated as a "boiler" pressure shaft 6 the pressure in the primary fluid remains and can be reduced in accordance with the invention via the high-pressure water turbines and/or pumps 9.

If, according to the invention, the two generators of the high-pressure water turbines 9 are electrically powered at the pressure heads of the two production shafts 2, the turbines rotate on the same drive shaft in opposite directions and become turbine pumps.

According to the invention these turbine pumps can be advantageously used to create the geoheat exchanger 5, in which they uniformly raise the fluid pressure from the pressure heads of all (three) super-deep boreholes or for a subsequent regeneration and/or new development of the geoheat exchanger the high-pressure valves 10 on the pressure heads of the production shafts are to be closed and the high-pressure valve 10 of the injection shaft is to be opened.

As a result of this method with apparatuses and in accordance with the invention an energy source is frequently used for the first time to operate SC vapor power plants or SC-$CO_2$ power plants and high-pressure waterpower turbines for the generation of electricity, as well as high-pressure water pumps for geoheat storage development by hydro-frac.

Thus, special advantages in comparison to the HDR method are that the heat-exchanger surfaces of the georeservoir can be expanded and/or opened again without problems even over a production time period of many decades in that the pressure in the closed system of the injection and production shafts is simply to be raised above the hydraulic turbines 9 operating as high-pressure pumps 9.

The invention with method and apparatus creates a stacked packet, e.g. of 3×30 fissured surfaces with an elliptical surface of 100×1000 m each that communicate with each other at intervals of, e.g. 100 meters between the theoretical fracture positions 5b in all three deep-boreholes in the lower three kilometers.

BRIEF DESCRIPTION OF THE DRAWING

FIG. 2 is a graph illustrating subcritical relationships;
and
FIGS. 3a, 3b, 3c, and 3d are further graphs illustrating the instant invention.

SPECIFIC DESCRIPTION

Figure 1:
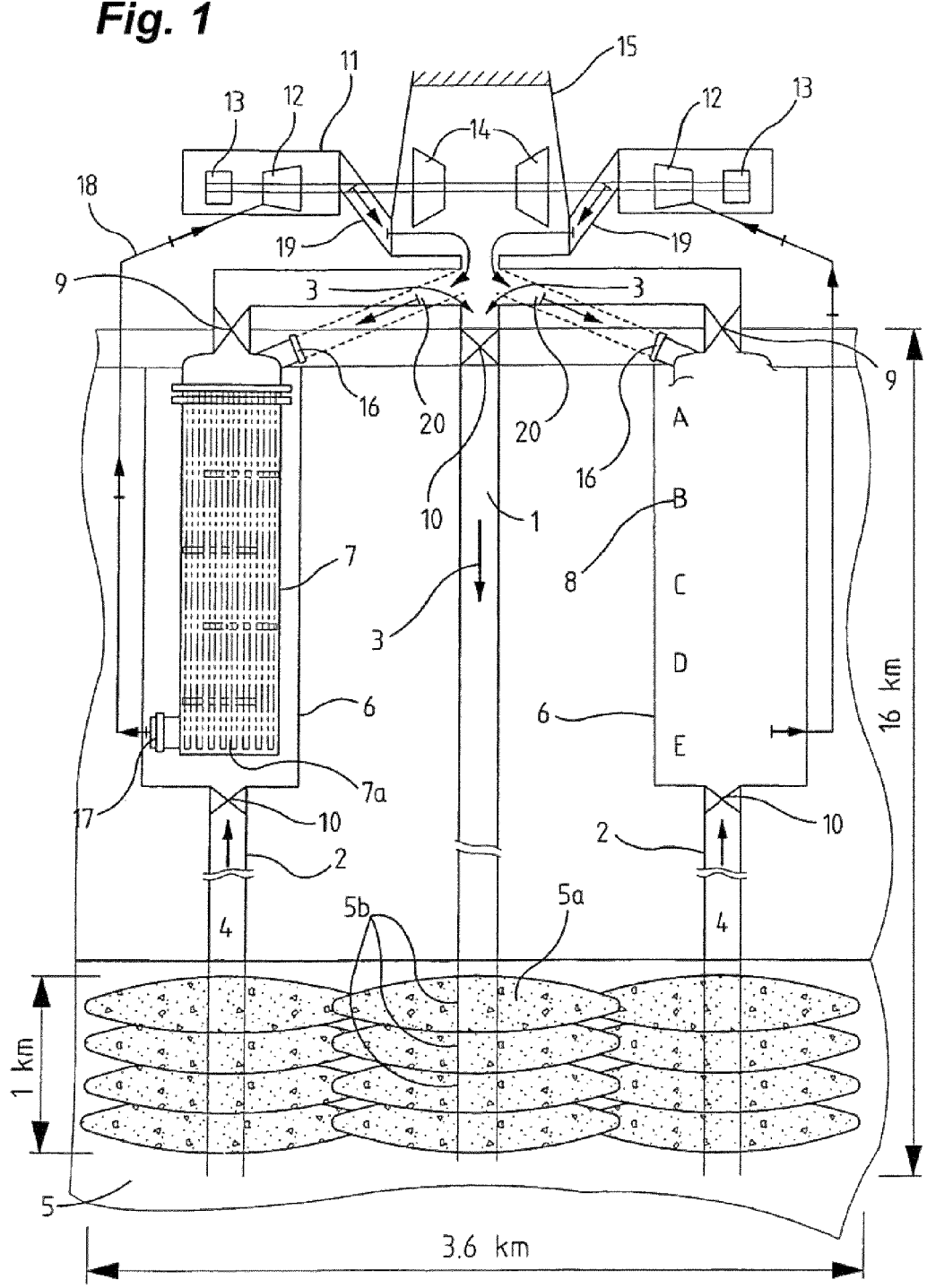
FIG. 1 is a largely schematic illustration of the invention.

One of the shafts, e.g. the middle shaft, can advantageously assume the task of the injection- or cold-water pressure shaft 1 and the other (two) the task of the production shaft 2 with supercritical fluid, with the cold-water column 3 in the injection shaft 1 being several times heavier than the hydraulic columns 4 in the production shafts with their supercritical fluid.

Thus, a stack of superposed, substantially elliptical fissured surfaces 5a that meet and/or overlap each other, thus forming in accordance with the invention a heat reservoir (SSB) 5 with a powerful heat exchanger surface are produced in the low stone area, e.g. of the lower 3 kilometers of the (three) super-deep boreholes spaced at a distance of 100 m from one another (see FIG. 1).

The creation of this artificial heat exchanger (SSB) 5 with its powerful heating surface is possible in accordance with the invention at this depth and given the large expansion of fissured surfaces under the high superposed pressure of the stone only via the above-cited metallic melt super-deep boring method with its strong pressure-casting lined super-deep boreholes 1, 2, 2, and the pre-programmed or subsequently constructed theoretical fracture positions 5b in the lower shaft kilometers.

The volume of this approximately 3 km high, 1 km wide and 3.6 km long stacked packet consisting of 1300 m×1000 m elliptical fissured surfaces is approximately 10 km³. The energy content of this developed, hot stone packet with its enormous energy content and, taking into consideration the heat flow from the earth mantle, is sufficient to operate a 1000 MW SC power plant for approximately 100 years at a reduction of the stone temperature, for example, of 700° C. to 500° C. over this production time period.

The invention has the basic problem of making available a method and apparatus of the initially cited type with which a fuel-free, economical self-sufficient energy supply can be ensured everywhere. This solves the problem of all problems, a lasting "global energy supply." Self-sufficient, decentralized, economical and fuel-free method steam supply makes possible a rapid, environmentally friendly industrialization for all countries with prosperity for all.

The main cause for wars—the battle for energy and water—would be eliminated.

SC (super-critical) geosteam 600° C./300 bar has per m³ 10 times the energy content as geothermal steam with 250° C./25 bar of a traditional geothermal power plant.

Traditional geothermal power plants such as in Iceland or New Zealand with parameters as previously cited are nevertheless the most economical and cleanest energy at the present in contrast to solar energy or electricity generated from hot thermal waters at 100° C., at which the kWh is 10 times more expensive than from fuel power plants. Alternative energies with a high net product, low requirement for capital and raw materials per kWh produced such as using SC geosteam in accordance with the invention are needed.

SC geosteam is the clean and self-sufficient oil replacement energy for the new millennium with an even higher net product than cheap light oil or "sweet oil" was for the $20^{th}$ century. Oil was the cheap and convenient lubricant for the industrial countries from which the massive prosperity of the automobile companies was previously created.

The invention offers the technological instrument for a "global, fuel-free industrialization" based on SC geosteam and is the solution path for a global prosperous society without war in harmony with nature.

A detailed explanation of method and apparatus for using SC geosteam via an SC geopower plant in combination with a hydraulic power plant using a variant of the concept in which the fluid of the geoprimary circuit consists of water and the fluid of the secondary circuit for the production of current of $SC-CO_2$:

According to the invention both closed fluid circuits can be operated with water or other fluids. The fluids—water and $CO_2$—used in the example have the advantage that they can be used in the cold range as liquid and in the hot range as supercritical liquid and an efficiency of approximately 50% is achieved at 600° C./300 bar working pressure and working temperature.

An advantage of $CO_2$ is its greater density in comparison to water and the fact that the entire $CO_2$ cycle for the generation of electricity with heat absorption and heat emission runs supercritically and consequently turbines, heat exchangers and cooling are built smaller by almost one order of magnitude than in the case of a water-steam circuit and is correspondingly more economical and correspondingly reduces the compressor work of the $CO_2$ circuit.

Another advantage is the lower material wear of the supercritical and inert $CO_2$ and the possibility in accordance with the invention of integrating the physically smaller heat exchangers into the pressure-stable production shafts (boiler pressure shaft) 5 of the geocircuit, which saves above-ground, expensive boiler systems, which is significant for the high operating pressures and makes possible an additional elevation of pressure in the secondary circuit with a corresponding elevation of efficiency.

The two different fluids in the primary and the secondary circuits additionally offer a better contrast, as an absolute novelty, of the utilization, in accordance with the invention, of the pressurized water of the two production shafts in the upper part of the "boiler" pressure shafts via two high-pressure water turbines 9, which pressurized water is to be worked after the removal of heat.

Therefore, the SC geosteam project in accordance with the invention offers for the first time in the history of power-plant technology the possibility of utilizing an energy source for the operation of a thermal power plant as well as simultaneously for the operation of a hydraulic power plant.

Supercritical water (SCW) in the primary circuit, as is used in the method with apparatuses in accordance with the invention, has excellent properties as is shown in the schematic status diagram of water in FIG. 2:

The end of the coexistence line water/water vapor is achieved at the critical point KP at p=221 bar and T=374° C. Above this point water is present as a homogenous fluid phase. The diagram furthermore shows the triple point TP as well as the different phases, namely, I: solid, II: liquid, III: gaseous, and IV: supercritical.

The changes of the physical property significant here in the transition into this area are shown in FIG. 2 at the bottom as a function of the temperature T at a constant pressure of p=400 bar.

FIG. 3a shows a sharp reduction of the viscosity η c 10-6 [kg/sm], FIG. 3b shows a moderate reduction of the density p[g/ml] and FIG. 3c shows a significant decrease of the dielectric constant ∈. The low values of the dielectric constant ∈ and as a consequence thereof the sharp decrease of the hydrogen bridge bonds cause, together with the reduction of the particle density, a high solubility for non-polar substances such as organic compounds and gases (O2, N2, $CO_2$), so that hydrocarbons are completely dissolved in SCW in the temperature range of 500° C. The hydrocarbon solubility is shown schematically in FIG. 3d. Hydrocarbons hardly occur in the super-deep area and are not under discussion here. The fact is more important in the method of the invention that the solubility of inorganic substances, schematically shown in diagram e), goes above the critical point in the direction of zero. The high solubility of salts in the sub-critical range, a serious corrosion problem in the traditional geothermal obtention of energy, is eliminated at once above the critical point. No more salts are dissolved out of the stone and salts present in the fluid are precipitated, so that an almost salt-free fluid is present. Production shafts 2 together with the system inventory are therefore not attacked or adversely affected by salts.

Also, the sharp reduction of the viscosity is especially advantageous. As a result thereof, friction in the geoheat exchanger (SSB) supercritical subsurface boiler is drastically reduced. SCW penetrates under the high static pressure into the smallest fissures and permeates all the rock even along the crystal surfaces. Likewise, even the friction on the pipelines and in the production shafts is minimized, as a consequence of which a high flow rate and minimal frictional losses are realized. The friction of the water under supercritical conditions is reduced by approximately a factor of 1000 and supercritical fluid flows in the SSB geoheat exchanger 5 through the smallest fissures in the deep stone already under the hydrostatic pressure of the cold water column of the injection shaft and the impedance in the SSB goes toward zero.

At the same time the heat transfer in the case of SCW is raised. This ensures that as a result of the drastic reduction of the viscosity in the supercritical fluid, friction during the upward flow of the supercritical fluid in the production shafts and on the pipe bundles of the secondary heat exchanger 7 can be disregarded given the large borehole diameters.

The use in accordance with the invention of supercritical $CO_2$ (SC-$CO_2$) as the fluid in the secondary circuit for the thermal conversion via a high-pressure turbine makes use of the advantage that $CO_2$ becomes denser than water under pressure, the thermal capacity of SC-$CO_2$ is limitless and as a result the thermal capacity per $m^3$ is greater in comparison to SC water and therefore heat exchangers, turbines, compressors and their containments can be made drastically smaller. (A 600 MWth turbine in the SC-$CO_2$ cycle with a diameter of 120 cm has a length of only 60 cm).

SC-$CO_2$ reduces the compressor work on account of its higher density and requires no expensive preparation as in the case of water for the secondary circuit. Thus, water preparation systems such as are necessary in a secondary circuit with water, are eliminated in the case of $CO_2$ as secondary fluid.

In contrast to SC steam power plants, in the SC-$CO_2$ cycle over 15 years of material experience at 650° C./200 bar are already present for all participating components of the heat exchanger via turbine to the compressor part.

After a detailed explanation of the special qualities of supercritical water as primary circuit fluid and supercritical $CO_2$ as secondary circuit fluid, a few explanations follow on the schematic presentation of the method with apparatuses for SC geopower production using a demonstration example as shown in FIG. 1.

FIG. 1 shows a schematic demonstration example of the method with apparatuses in accordance with the invention for SC-geopower production via an SC-$CO_2$ thermal power plant with two, e.g. 500 MWel turbines 12 and a hydraulic power plant for two water high-pressure turbines 9 with, e.g. approximately 50 MWel output each at a maximal superpressure reduction of 1000 bar in the geofluid present at the two pressure heads of the production shafts 2 after the geofluid of the primary circuit has given off its heat via the secondary heat exchanger 7 in the "boiler" pressure shaft 5 to the SC-$CO_2$ fluid in the secondary circuit.

The primary circuit with water as fluid is shown by an arrow open at the back and the secondary circuit with $CO_2$ as fluid by an arrow closed at the back.

For the sake of clarity, only one secondary heat exchanger A is shown in the left "boiler" pressure shaft 5, around which supercritical geofluid flows. In the real production method the secondary heat exchanger can consist of a column of heat exchangers as is characterized in the right "boiler" pressure shaft by the letters A-E, which are integrated by a simple closure and accordingly can be readily disassembled for cleaning and repair.

The primary circuit in accordance with the invention comprises a closed natural forced circuit that is driven by gravity on account of the heavy cold water column 3 in the injection shaft 1 and of the lighter hot water column 4 in the two production shafts 2.

The SC-$CO_2$ secondary circuit in accordance with the invention in combination with two heat exchangers 7 integrated in two "boiler" pressure shafts 6 consists of two forced circuits that can be driven via two compressors 14, in particular ones that start with, for example, 40° C./300 bar, are heated in the secondary heat exchangers 7 to 600° C. and are effective via turbines to generate current or power.

The total efficiency of the demonstration system reaches 50% (net efficiency).

The creation of a deep SSB geoheat exchanger 5 and its expansion is only possible via the method with apparatuses in accordance with the invention as follows.

The above-cited (metallic melt boring method) magnetic slider super-deep boring method produces production-ready super-deep boring shafts with the pressure-stable borehole lining consisting of a casting as required, so that it resists the high intrinsic pressure of the cold water column 3 of 1600 bar in the lower part of the injection shaft 1 and the high production pressure of, for example, 1000 bar even in the upper part of the production shafts 2.

This high-pressure stability of the borehole lining of metallic casting simplifies the previous creation of SSB (geoheat exchangers) in the hot deep stone with the aid of hydro-frac in a basic manner and make super-deep geoheat exchangers like those shown in the demonstration example possible for the first time.

The, e.g. lower 3 kilometers of the injection and production shafts 1, 2 that are, e.g. 16 km deep in the demonstration example are provided with radially placed theoretical fracture positions located, for example, at a distance of 100 m above each other. These theoretical fracture positions are produced, for example, directly during the production of the borehole lining or by melting a ring zone subsequently via a magnetic slider unit with melting apparatus.

The construction of the SSB (geoheat exchanger) 5 and the production-ready buildup of the primary circuit (geocircuit) take place in one work step by flooding the three deep boreholes with open high-pressure valves 10.

The three deep boreholes connected on the surface via a high-pressure line to a closed system are filled with pressurized water via the two hydraulic turbines 9, that operate to this end as high-pressure pumps, until the pressure at the theoretical fracture positions is greater than the horizontal minimal tension prevailing there in the deep stone. Since the shear forces of the stone are approximately 10 times less than the pressure forces of the stone and the shear forces dramatically decrease after a temperature of around 300° C., in particular in the presence of water, it can be assumed that the hydro-frac begins at the deepest theoretical fracture position with the highest stone covering pressure under hydrostatic pressure already, that is 1600 bar at 16000 m deep. Given an additional pump pressure of 300 bar the pressure at the deepest theoretical fracture position would be 1900 bar and at the highest theoretical fracture position at least 1600 bar.

At a pump delivery of 1 $m^3$/s for each of the two pumps at a pressure of 300 bar, 12 hours are sufficient for filling the shaft volume of approximately 40,000 $m^3$.

The volume of a georeservoir of approximately 10 $km^3$ with a fissured surface stack of 90 fissured surfaces at 1300 m×1000 m with an average fissure opening of only 1 cm yields a volume of approximately 1,000,000 $m^3$ that is produced and filled up within 6 days of pumping operation. That is, within one week an SSB (georeservoir) 5 with a volume of 10 $km^3$ hot stone from 500-700° C. and several million $m^2$ of heating surface is created from which 1100 MWel current can be obtained from a combined SC heat- and water power plant for 100 years.

The previous numbers are not to be taken as exact numbers but rather should only indicate the potential and the high productivity of the method with apparatuses in accordance with the invention. In reality, once a supercritical subsurface boiler (SSB) has been developed, it does not cool off with increasing production time but rather becomes richer in energy since the supercritical water expands automatically into deeper hot regions under the enormous static pressure and on account of the decreasing viscosity at increasing temperature.

FIG. 2 shows the changes of important properties of water during the transition into the supercritical area.

LIST OF REFERENCE NUMERALS 1 injection shaft
2 production shafts
3 pressurized water column (cold water fluid)
4 SC water column (hot water fluid)
5 supercritical subsurface boiler (SSB)—geoheat exchanger
5a horizontal elliptical fissured surface in the geoheat exchanger
5b position of the theoretical fracture positions in the borehole cast iron lining
6 "boiler" pressure shaft
7 secondary heat exchanger (A)
7a heat exchanger open at the bottom for the flowthrough of the geofluid
8 secondary heat exchangers A-E installed in series
9 pressurized water turbines and high-pressure pumps (pressure reduction/primary circuit)
10 high-pressure valves for injection shaft and production shafts
11 turbine housing
12 turbine
13 generator
14 compressor
15 cooling tower with water- or air cooling
16 SC-$CO_2$—inlet connecting piece
17 SC-$CO_2$—outlet connecting piece from the secondary heat exchanger
18 SC-$CO_2$—turbine entrance temperature 600° C.
19 SC-$CO_2$ worked
20 SC-$CO_2$ compressed
21 arrow open at the rear: primary circuit (circuit fluid=water)
22 arrow closed at the rear: secondary circuit (circuit fluid—$CO_2$)

The invention claimed is:

1. A process for creating and/or operating an supercritical geosteam system by several boreholes constructed by a metal-melt boring process that each comprise a metal borehole lining consisting of a casting and continuously produced from the metal-melt medium and in which the boreholes are sunk to depths at which supercritical conditions prevail and the spaced boreholes are connected to each other by fissure formations in the lower shaft area and form a primary circuit wherein the supercritical geosteam system is operated in combination with a hydraulic power plant and that an injection shaft for transporting subcritical primary fluid into the earth is formed by at least one borehole and a production shaft for transporting supercritical primary fluid from the earth is formed by at least one further borehole, which primary fluid is present in the injection shaft in subcritical liquid phase and is present supercritically in the production shafts down to the lower area of the secondary heat exchangers, and that the supercritical primary fluid transmits its heat to secondary heat exchangers for the production of current, power or the production of process steam and/or heat, which secondary heat exchangers are arranged in the upper part of the production shafts, and that subcritical and cooled-down primary fluid develops again from supercritical primary fluid by the removal of heat which subcritical and cooled-down primary fluid still has the same pressure as the supercritical primary fluid.

2. The process as defined in claim 1 wherein theoretical fracture points are let into the borehole lining at defined intervals from each other in the lower area of the boreholes.

3. The process as defined in claim 1 wherein the boreholes are connected on the surface by at least one high-pressure line to a closed system, which at least one high-pressure line comprises high-pressure valves and/or high-pressure pumps.

4. The process as defined in claim 1 wherein the boreholes are filled with water so that the theoretical fracture points break open by the built-up hydrostatic pressure, in particular under pressure elevation by means of high-pressure pumps, and that a stack of fissured surfaces that are connected to each other is formed between the boreholes by horizontal fissured surfaces at defined superposed intervals, which stack is utilized as a geoheat exchanger and/or primary heat exchanger.

5. The process as defined in claim 1 wherein in order to circulate the fluid or fluids a natural circuit driven by gravity is formed in which fluid sinks down in at least one injection shaft by gravity and rises as supercritical fluid with reduced density in at least one production shaft and flows through a secondary heat exchanger in at least one production shaft, and that the natural production circuit is started after the pole reversal of the high-pressure pumps and by the removal of heat from the supercritical primary circuit of the production shafts via secondary heat exchangers in the two "boiler" pressure shafts as well as by a reduction of pressure via hydrostatic turbines.

6. The process as defined in claim 1 wherein current or power is produced from the primary fluid by the removal of heat via the secondary heat exchangers in the supercritical geosteam system, and that additional current or power is obtained from the remaining pressure in the primary fluid at the head of the production shafts via hydraulic turbines in a hydraulic power plant.

7. The process as defined in claim 1 wherein the primary circuit in the injection shaft, that is closed to the outside world, is a gravity-operated forced circuit, and that a forced circuit additionally operated by thermal expansion develops in the production shafts that results in the saving of the pump energy with which the cold primary fluid is driven through the geoheat exchanger and that the fluid that became supercritical thereby is driven through the production shafts and through the "boiler" pressure shafts and again as subcritical primary fluid through the hydraulic turbines.

8. A supercritical geosteam system with several boreholes constructed by a metal-melt boring process that each comprise a metal borehole lining consisting of a casting and continuously produced from the metal-melt medium and in which the boreholes are sunk to depths at which supercritical conditions prevail and the spaced boreholes are connected to each other by fissure formations in the lower shaft area and form a primary circuit wherein it is operated in combination with a hydraulic power plant and forms a closed production process with hydraulic turbines with water as primary fluid, that an injection shaft for transporting the subcritical primary fluid into the earth is formed by at least one borehole, that a production shaft for transporting supercritical primary fluid from the earth is formed by at least one further borehole, which primary fluid is present in the injection shaft in subcritical liquid phase and is present supercritically in the production shafts down to the lower area of the secondary heat exchangers, that secondary heat exchangers are arranged in the upper part in the production shafts in which the supercritical primary fluid transmits its heat for the production of current and power or for the production of process steam and/or heat, and that the supercritical primary fluid can be converted again into subcritical and cooled-down primary fluid by the removal of heat that has the same pressure as the supercritical primary fluid.

9. The supercritical geosteam system as defined in claim 8 wherein that metal-lined boreholes have such a strong pressure-cast lining that they resist the hydrostatic fluid pressure except for areas of provided theoretical fracture points, and that the lower area of the boreholes comprises theoretical fracture points in the borehole lining that are let in at defined distances from each other and are radially placed.

10. The geosteam system as defined in claim 1 wherein the lower area of the boreholes comprises theoretical fracture points in the borehole lining that are let in at defined distances from each other and are vertically placed where the minimal tension of the mountain range runs vertically.

11. The supercritical geosteam system as defined in claim 1 wherein after the completion of the boreholes a high-pressure line connects the pressure heads of the injection shafts and production shafts to each other to a closed system in such a manner that all shafts can be uniformly loaded with high water pressure by high-pressure turbines as high-pressure pumps for the production of fissure formations between the shafts, and that a geoheat exchanger can be produced in the deep stone via the closed hydraulic primary circuit consisting of injection- and production shafts under the elevation of pressure by the high-pressure pumps in addition to the hydrostatic pressure via the theoretical fracture points.

12. The supercritical geosteam system as defined in claim 1 wherein the closed hydraulic primary circuit with its supercritical fluid constantly raises the available heat capacity in the geoheat exchanger and independently expands beyond the original size at the lowest depth of the SSB with the highest pressure and the highest temperature.

13. The supercritical geosteam system as defined in claim 1 wherein at least one production shaft is designed as a "boiler" pressure shaft for housing the secondary heat exchanger in situ, that the secondary heat exchangers are built larger as a result, the expensive boiler pressure walls on the surface of installed pressure boilers are eliminated and the walls are designed in a more moderate manner in spite of distinctly greater working pressures in the primary and in the secondary circuit since the high inner pressure is compensated by the higher outer pressure, conditioned in particular by the shaft walls, and vice versa.

14. The supercritical geosteam system as defined in claim 1 wherein the hydraulic turbines are arranged with generators on the same shaft and by pole reversal the generators become engines and the hydraulic turbines become high-pressure pumps whose output can be utilized for the "hydro-frac" work.

15. The supercritical geosteam system as defined in claim 1 wherein a secondary steam circuit operates an supercritical steam power plant by the removal of heat from the geoprimary circuit.

16. The supercritical geosteam system as defined in claim 1 wherein the superpressure of the primary circuit in the upper part of the "boiler" pressure shafts can be utilized by conversion as current or power after the removal of heat by the secondary heat exchanger via hydraulic turbines.

\* \* \* \* \*

UNITED STATES PATENT AND TRADEMARK OFFICE
CERTIFICATE OF CORRECTION

| | |
|---|---|
| PATENT NO. | : 7,975,482 B2 |
| APPLICATION NO. | : 12/298348 |
| DATED | : July 12, 2011 |
| INVENTOR(S) | : Werner Foppe |

It is certified that error appears in the above-identified patent and that said Letters Patent is hereby corrected as shown below:

Title Page, Item (73) Assignee should read

Werner Foppe, Geilenkirchen (DE) - 90% ownership
Franz-Josef Radermacher, Ulm (DE) - 10% ownership Signed and Sealed this
Seventeenth Day of April, 2012

David J. Kappos
*Director of the United States Patent and Trademark Office*